(12) United States Patent
Brett

(10) Patent No.: US 8,128,407 B2
(45) Date of Patent: Mar. 6, 2012

(54) METHOD AND SYSTEM FOR TEACHING MATH

(75) Inventor: Kenton Brett, Indianapolis, IN (US)

(73) Assignee: Kenton Brett, Indianapolis, IN (US)

( * ) Notice: Subject to any disclaimer, the term of this patent is extended or adjusted under 35 U.S.C. 154(b) by 890 days.

(21) Appl. No.: 12/150,073

(22) Filed: Apr. 24, 2008

(65) Prior Publication Data

US 2008/0268407 A1   Oct. 30, 2008

Related U.S. Application Data

(60) Provisional application No. 60/913,866, filed on Apr. 25, 2007.

(51) Int. Cl.
*G09B 1/00* (2006.01)

(52) U.S. Cl. ...................................... 434/195

(58) Field of Classification Search .................. 434/187, 434/188, 191, 195, 196, 205, 207
See application file for complete search history.

(56) References Cited

U.S. PATENT DOCUMENTS

| | | | | |
|---|---|---|---|---|
| 1,471,437 A * | 10/1923 | Wood | | 434/195 |
| 2,899,757 A * | 8/1959 | Webb | | 434/204 |
| 3,204,343 A * | 9/1965 | Pollock | | 434/195 |
| 3,410,002 A * | 11/1968 | Mulholland et al. | | 434/195 |
| 4,144,657 A * | 3/1979 | Dumovich | | 434/187 |
| 4,518,359 A * | 5/1985 | Yao-Psong | | 434/195 |
| 4,812,123 A * | 3/1989 | House | | 434/195 |
| 5,297,965 A * | 3/1994 | Manancero | | 434/195 |
| 5,421,732 A * | 6/1995 | Taylor | | 434/195 |
| 5,597,308 A * | 1/1997 | Woldenberg et al. | | 434/196 |
| 5,599,188 A * | 2/1997 | Lemos Melendez | | 434/195 |
| 6,575,754 B2 * | 6/2003 | Salvo | | 434/195 |
| 6,739,875 B1 * | 5/2004 | Lin | | 434/195 |
| 7,059,861 B1 * | 6/2006 | Baumgartner | | 434/195 |
| 7,104,799 B1 * | 9/2006 | Sansing | | 434/195 |
| 7,695,283 B2 * | 4/2010 | Buhrman | | 434/195 |

* cited by examiner

*Primary Examiner* — Kurt Fernstrom
(74) *Attorney, Agent, or Firm* — Maginot, Moore & Beck

(57) ABSTRACT

A method and device for teaching mathematics comprises a plurality of elongated members used to teach mathematics concepts. Each of the plurality of elongated members represent an associated numerical value. At least some of the plurality of elongated members are of different lengths, wherein the length of each of the plurality of elongated members is proportional to the numerical value represented by the elongated member. A plurality of retention members configured to receive the elongated members. Each of the plurality of retention members is configured to receive at least two of the plurality of elongated members. The device also comprises a numberline associated with the plurality of retention members. When the elongated members are placed on the retention member, various mathematical concepts may be shown.

18 Claims, 14 Drawing Sheets

METHOD AND SYSTEM FOR TEACHING MATH

CROSS-REFERENCE TO RELATED APPLICATIONS

This application is related to USPTO disclosure document number 585826, entitled Math Learning Tool, which was received by the USPTO on Sep. 12, 2005. In addition, this application claims priority from U.S. Provisional Patent application No. 60/913,866, filed Apr. 25, 2007, entitled Method and System for Teaching Math.

FIELD

This application relates to a method and system for teaching math that provides a visual representation of numbers against a number line backdrop.

BACKGROUND

With increasing globalization and continuing advances in technology, a quality education in math and the sciences is critical for today's students. Therefore mastery of basic math skills is more important than ever.

The U.S. ranked 24th of 29 member nations on the 2003 Programme for International Student Assessment (PISA, 2003), demonstrating a continued lag in math and science.

The general public is concerned about this problem, and it has been prevalent in the popular press. In the 2007 National Assessment of Educational Progress, only five percent of fourth grade students and seven percent of eighth grade students attained advanced levels of mathematics.

As kids better tools are needed as interventions for today's students. Such tools may also help gifted students and students achieving at grade level, and could be important in future MLD research.

Manipulative teaching aids have been used in mathematics education for centuries. There are many in use today that are helpful in teaching the many math concepts students need to learn. The most popular manipulatives, including Cuisenaire Rods, Unifix Cubes, and Base Ten Blocks are widely accepted as standards in teaching basic mathematic concepts to young children. Over many years, a large volume of research has found that the use of manipulatives by students improves their performance. Unfortunately in many classrooms they are rarely used, due in part to problems related to convenience and effectiveness.

These tools involve many, sometimes hundreds of pieces, which are often scattered on desks, tables or floors. Much time is spent constructing the desired pieces, or finding and retrieving them. When several students are working simultaneously, classrooms can become chaotic and learning is slowed or halted. Because young children have short attention spans, these problems can cause missed opportunities for learning.

In addition, these manipulatives fall short in demonstrating many key ideas and number relationships and in bridging the gap between concrete examples and abstraction. Accordingly, it would be advantageous to provide a more convenient manipulative to fill these gaps and provide an additional, more intuitive representation of these concepts, especially the basic math facts.

In addition to manipulative, the numberline is significant features used in teaching basic math facts, as an important intermediate step between physical counters and mental abstraction. However, as yet there are no manipulatives which provide highly convenient, intuitive demonstrations using the numberline. Accordingly, it would be advantageous to provide a more intuitive manipulative teaching tool which is number-line based so that children, many of whom are visual-spatial learners, can readily understand and remember basic mathematical concepts, and begin abstraction of those concepts.

Once a student has a basic understanding of the math facts, and is ready to master rapid recall, manipulatives are less useful. When every second counts, even the most convenient manipulative is too slow. Traditional flash cards are quick, but there are traditional problems too, most notably the need for many hours of one-on-one instruction that many students never receive. Computer programs can solve that problem and others, including the need for automatic tracking of answers, instant reporting of results and trends.

Certainly these are significant advantages, and some existing computer flashcard programs are very useful. Unfortunately, many of these computer programs place more emphasis on gaming than learning. Most are low quality and do a poor job of training the user for rapid recall of the many facts. Even the more advanced computer flashcard programs, such as Math Blaster and Fastt Math, have no elements to assist students when they have difficulty with a problem, and no elements that frame the process for moving students from concrete manipulatives to virtual manipulatives in their programs.

In view of the foregoing, it would be advantageous to provide a serious practice program that calls up a helpful virtual manipulative at just the right times—a new virtual manipulative that improves understanding and retention.

It would be advantageous if this virtual manipulative could also be supplemented by an analogous real world hands-on experience that allows children to construct a personalized set of math fact strategies to be displayed by these virtual manipulative, giving students more ownership in these strategies and facts. The personalized strategies could then be stored and used in presenting the virtual manipulative reminders at critical moments when a student encounters difficulty.

It would also be advantageous if such program offered the option for computer selection of drills and practice sessions based on continuous monitoring of students' performance, along with curricula customized to the personalized strategies developed by the students using the corresponding physical manipulative.

In view of the foregoing, it would be advantageous to provide a highly convenient and effective way to translate many basic math concepts directly to the numberline, thereby advancing learning success. It would also be advantageous to provide a more intuitive way to visualize, comprehend, and memorize basic math concepts in order to bridge the gap between the concrete and the abstract for students. Yet another advantage would be to provide a computer program based on these visual impressions that builds math fact fluency stepwise for children who are memorizing addition, subtraction, multiplication and division.

While it would be desirable to provide a method and system for teaching math that provides one or more of the foregoing or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

A device for teaching mathematics comprises a plurality of elongated members, each of the plurality of elongated members representing an associated numerical value. At least some of the plurality of elongated members are of different lengths, wherein the length of each of the plurality of elongated members is proportional to its associated numerical value. The device further comprises a plurality of retention member configured to receive the elongated members. Each of the plurality of retention members is configured to receive at least two of the plurality of elongated members. The device also comprises a numberline associated with the plurality of retention members.

In at least one embodiment, the elongated members are differently colored bars, each color associated with a particular numerical value represented by the elongated member. The elongated members representing numerical values greater than one include indicia provided along the length of the elongated member, wherein each indicia indicates an increment of one upon the elongated member. In at least one embodiment, the indicia is a circumferential groove provided in the elongated member. In addition, a number may be printed on each of the plurality of elongated members, wherein the number represents the numerical value represented by the elongated member.

The plurality of retention members for the device may be provided by tracks formed by grooves in a base member. The tracks are substantially continuous along the base member. The numberline is provided along a top portion of the base member, the numberline including a plurality of lines associated with the tracks, each line indicating a numerical value of one on the numberline. In at least one embodiment, the at least three tracks are provided in the base member, with the tracks extending parallel to each other. Each track spaced apart from any neighboring track such that elongated members may be aligned on neighboring tracks without contacting one another.

The above described features and advantages, as well as others, will become more readily apparent to those of ordinary skill in the art by reference to the following detailed description and accompanying drawings.

DESCRIPTION

A method and system for teaching math generally comprises a plurality of physical manipulatives which are representative of numerical values. The physical manipulatives are provided in the form of elongated members such as bars, rods, shafts, etc. The elongated members are configured to fit neatly into retention members extending substantially parallel to each other, each of the plurality of retention members configured to receive at least one of the plurality of elongated members. The plurality of retention members is associated with a numberline. As will be explained in further detail herein, the multiple tracks or grooves can show relationships between functions in a very effective way that is not found with other manipulatives.

Figure 1:
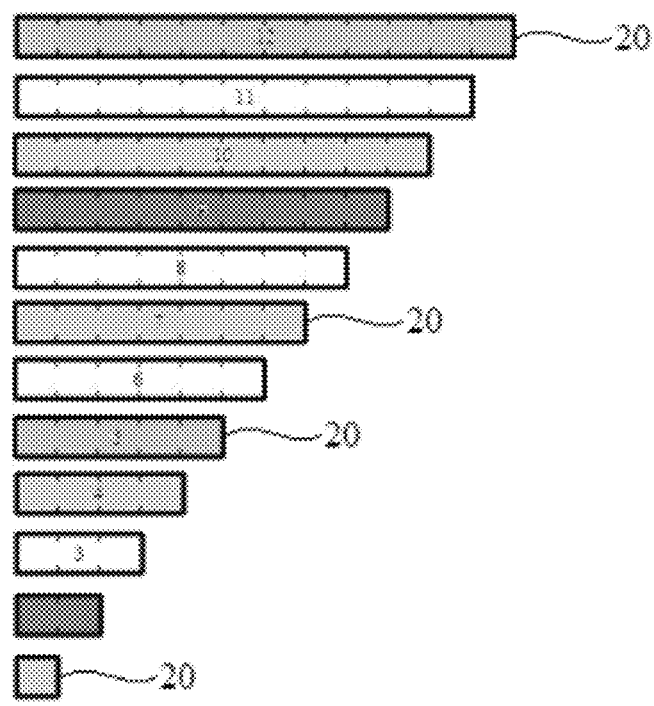
FIG. 1 shows a plurality of elongated members which may be used for the method and system for teaching math disclosed herein.

With reference now to the embodiment of FIG. 1, a plurality of elongated manipulatives are provided as differently colored bars 20 (also referred to herein as "rods"), with all bars of the same length having the same color along the length of the bar. For example, all bars having a length of five may be a blue color, while all bars having a length of six may be a yellow color. The bars 20 are generally cylindrical in shape with a substantially round cross-section. The bars may include anti-roll features, such as at least one flattened portion in order to prevent the bars from rolling across a table. It will be recognized that the bars may also be provided with numerous other shapes which may inherently include anti-roll features. For example, the bars may be generally cylindrical with a polygonal cross-section (e.g. a hexagonal cross-section).

The bars 20 may be made of various materials such as a wood, a metal or a plastic material. In at least one embodiment, the bar comprises a ½ inch acrylic rod 20. The acrylic rod is translucent, allowing the user to see through the bar even though it is colored. However, in other embodiments, the bars may be opaque, such as a painted bar that is completely covered with a particular color, depending on the length of the bar. In still other embodiments, the bars may even be transparent.

Figure 2:
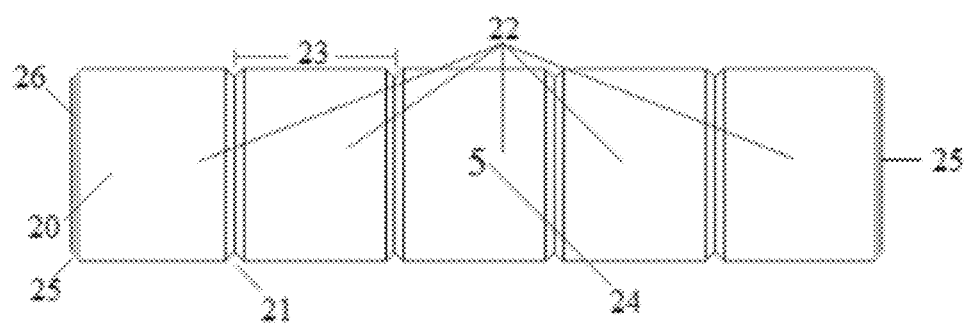
FIG. 2 shows an enlarged view of one of the elongated members of FIG. 1.

In the embodiment of FIG. 1, the bars 20 are of every length from one to twelve centimeters, in increments of one centimeter. FIG. 2 illustrates a detailed view of an elongated member in the form of a five segment bar. In this embodiment, the bar 20 includes counter indicia 21 to mark each centimeter of length and simultaneously delineate the counter segments 22. In the embodiment of FIG. 2, the counter indicia are provided by circumferential grooves 21 inscribed on the bar 20. It will be recognized that in other embodiments, the indicia may take other forms, such as circumferential markings provided incrementally on the bar.

In the embodiment of FIG. 2, the distance 23 from the center of one circumferential groove 21 to the next is one centimeter. The rods longer than 2 cm are labeled 24 with a numeral according to their length for ease of locating desired bars during use. The ends of the bars are beveled 25 for design and feel, and also colored with a contrasting color 26 to aid in differentiating like colored bars placed end to end. For example, all blue bars having a length of five centimeters may also have a gold color at the beveled end 25 of the bar.

With reference now to the embodiment of FIG. 3, a plurality of retention members for use in association with the bars 20 are shown. The retention members (which may also be referred to herein as "tracks") are provided within a foldable case 28 that includes a top member in the form of a top plate 32 and a bottom member in the form of a base plate 31. The tracks 30 are provided as grooves 30 in the base plate 31 which provide seats for the bars 20. The base plate 31 is connected to a similarly grooved top plate 32.

The grooves 30 are each designed and dimensioned to receive the bars 20 such that the bars may be seated in the grooves 30 without rolling or sliding out of the groove. To this end, in at least one embodiment, each groove 30 provides a semi-circular channel that extends laterally from one end to another end of the case 28. The channels are sufficiently long such that multiple bars may be seated end-to-end in each groove. For example, the channels may be twenty or thirty segments long, allowing several bars 20, both long and short, to rest in a single groove. Multiple grooves 30 are also provided in each plate. This allows bars 20 to be placed in a plurality of rows and different combinations of bars to be compared, as explained in further detail below.

Figure 3A:
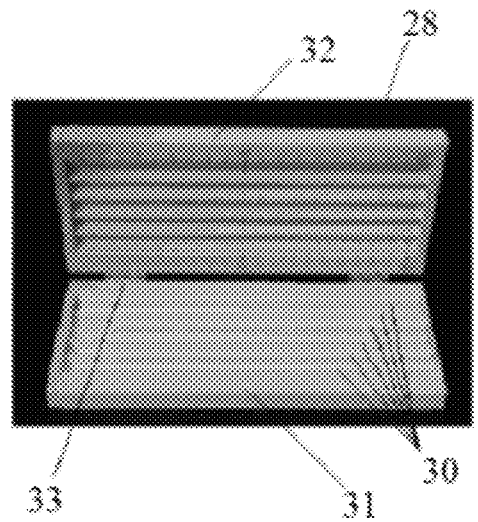
FIGS. 3A-3C show a case for the elongated members of FIG. 1, the case including a plurality of retention members and a numberline.
Figure 3B:
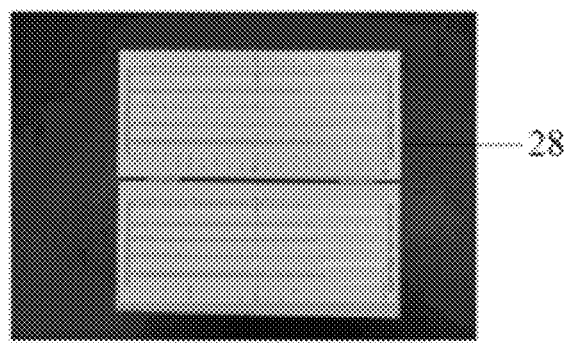
Figure 3C:
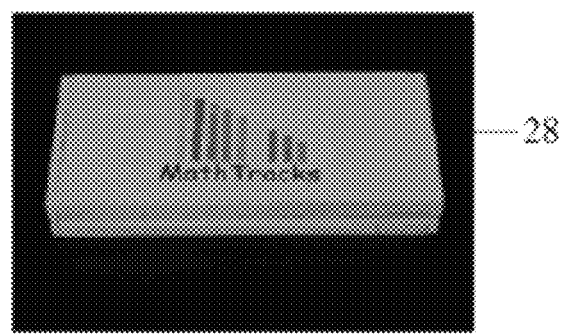

The case 28 which includes the grooves 30 may be comprised of wood, metal, plastic, or any other appropriate material. As shown in FIG. 3, hinges 33 connect the top plate 32 to the base plate, allowing the case to open and fold. FIG. 3A illustrates the case 28 in a semi-open position. FIG. 3B illustrates the case 28 in the open position which is the position intended for use. The case 28 folds shut for convenient storage of the pieces, as shown in FIG. 3C.

Figure 4:
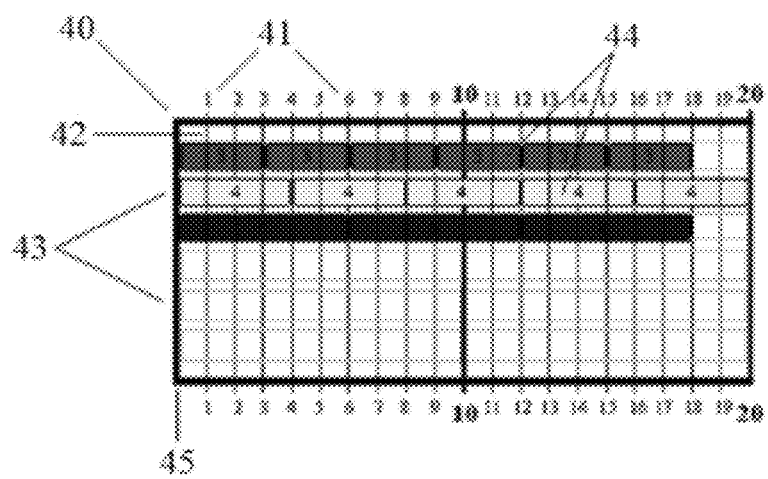
FIG. 4 shows a close up view of a plurality of elongated members positioned on the retention members and associated with the numberline of FIG. 3A.

Turning now to the embodiment shown in FIG. 4, the tracks are provided as grooves 43 on a flat white board 40 made of wood or plastic. The board is labeled with black numbers 41 from one to twenty, each number denoting lines 42 one centimeter apart running perpendicular to the grooves 43. Together the numbers 41 and lines 42 comprise the numberline. As illustrated in FIG. 4, the bars 44 are placed in the grooves 43 and slid against the bumper 45 at the end of the grooves, which is mathematically at the zero position. As noted previously, both the length and the number of segments of the bar indicate its value. Additional bars are placed the grooves 43 in various arrangements to demonstrate mathematical concepts. In another embodiment the board 40 is approximately one meter long and is numbered from one to one hundred for demonstration of mathematical concepts requiring numbers larger than twenty.

Figure 5:
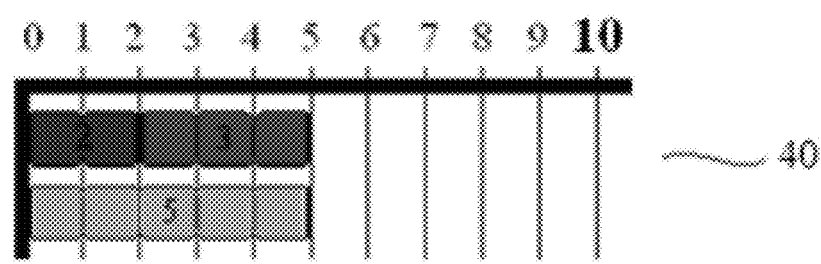
FIGS. 5-16 show various mathematics concepts that may be shown using the elongated members, the retention members and the numberline of FIG. 4.

FIG. 5 shows use of a portion of the board 40 to illustrate the concept of addition. In particular, the concept of two plus three equals five (2+3=5) is shown in the arrangement of FIG. 5. In teaching beginners, the bars would be placed stepwise, noting at each step the number of segments and how they relate to the numberline. Illustration of subtraction is done similarly by reversing these steps.

Figure 6:
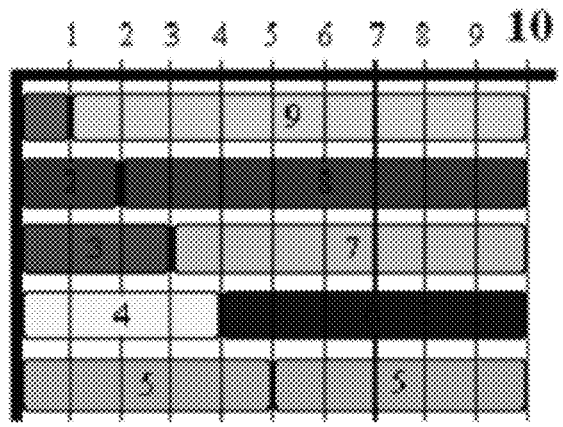

As will be recognized by those of skill in the art, the elongated members and retention members disclosed herein may be used to demonstrate numerous mathematics concepts. For example, FIG. 6 illustrates the set of integers that add to ten; an important step in furthering addition skills.

Figure 7:
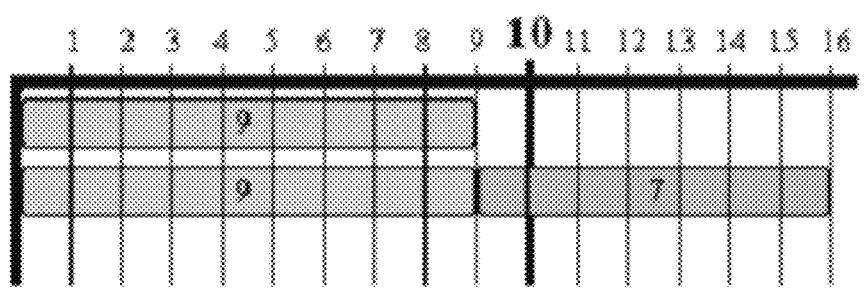
Figure 8:
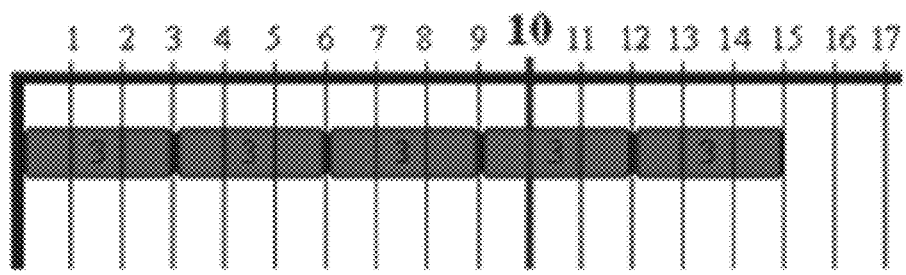

FIG. 7 illustrates one of the helpful rules for addition: addition to nine. In particular, an educator might explain that the nine-bar is just one short of the important "Ten-line", so anything added to nine will be "one-less-teen". So seven added to nine will be sixteen. Many of the helpful hints that aid students in memorization can be reinforced in a similar fashion. In similar fashion, FIG. 8 illustrates an arrangement designed to demonstrate skip counting and multiplication by three.

Figure 9:
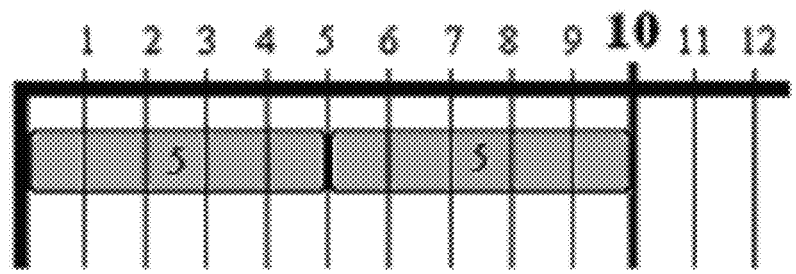

FIG. 9 illustrates division of ten by two. Starting with a ten-bar in place, the division is proposed and then demonstrated.

Figure 10:
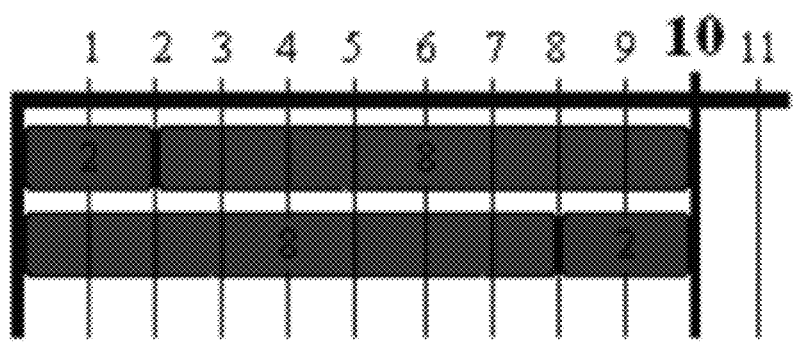

FIG. 10 illustrates the commutative property of addition, for example, 2+8=8+2.

Figure 11:
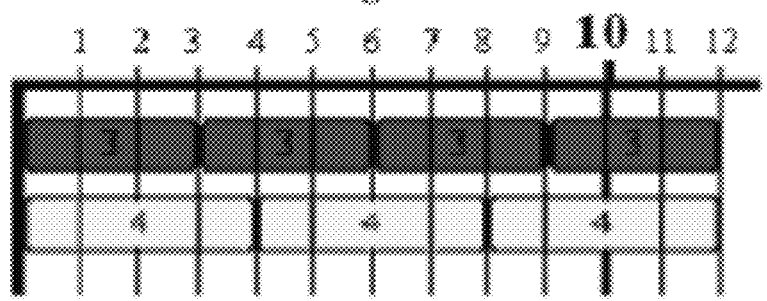

FIG. 11 illustrates the commutative property of multiplication, for example, $3 \times 4 = 4 \times 3$.

Figure 12:
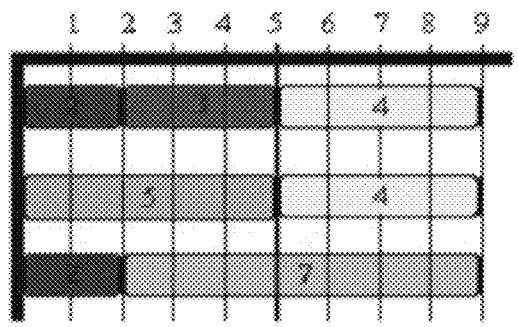

FIG. 12 illustrates the associative property of addition, specifically, (2+3)+4=2+(3+4). In a similar manner, it can be demonstrated that subtraction is neither commutative nor associative.

Figure 13:
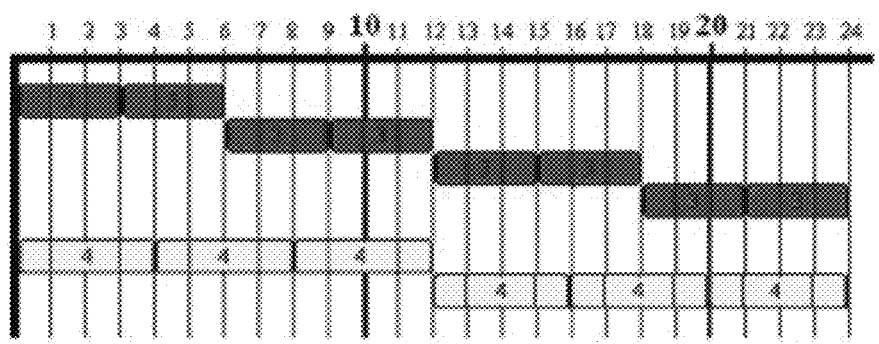

FIG. 13 illustrates the associative property of multiplication, for example, $(2 \times 3) \times 4 = 2 \times (3 \times 4)$, first by demonstrating $2 \times 3$ and $3 \times 4$, then showing that four sets of the former equals two sets of the latter.

Figure 14:
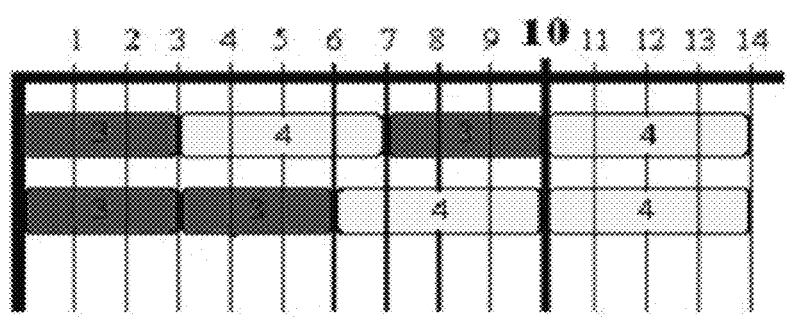

FIG. 14 illustrates the distributive property, for example, $2 \times (3+4) = 2 \times 3 + 2 \times 4$.

Figure 15A:
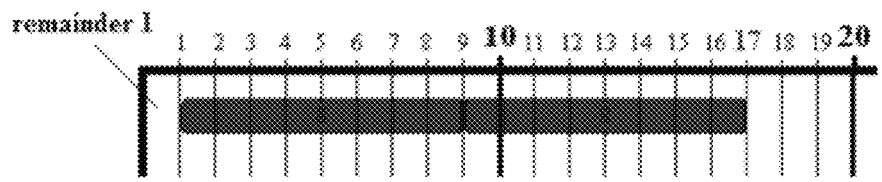

FIG. 15A illustrates division with remainder, specifically, $17 \div 8 = 2$ remainder 1.

Figure 15B:
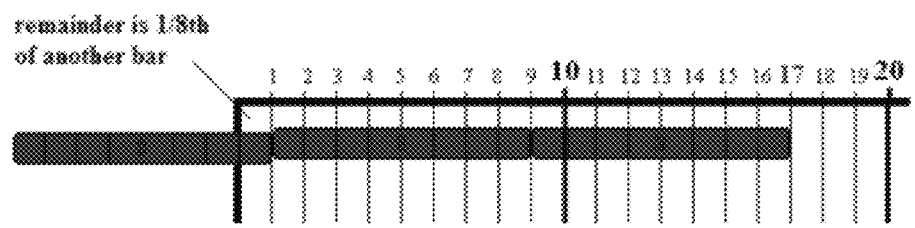

FIG. 15B continues the demonstration, showing that the answer may also be given in fractional terms. $17 \div 8 = 2\frac{1}{8}$.

Figure 16:
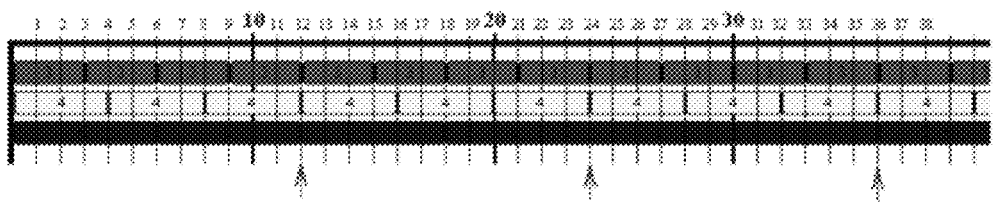

FIG. 16 illustrates common multiples of three, four and six. With such visual displays, such concepts may become intuitive. It will be recognized that the numeral thirty is a multiple common to three and six but not four; and every multiple of six is also a multiple of three. In a similar way, there are numerous exercises that can be used by students to observe, reason, discover, and explain various other mathematical concepts, including prime numbers, squares and cubes, currency, fractions, decimals, prime factorization, and more.

The above-described embodiments of the math tool address many of the common challenges of manipulatives cited by educators. For example, the disclosed embodiments provide a device that stores the bars conveniently in a single box which is also the same device where the bars will be used, thus allowing the user to simply close and shelve the box. Unlike some manipulative tools, at least one embodiment of the method and system for teaching math disclosed herein does not require extensive set-up or counter group building. Rather, when a student opens the box, the bars are ready groups, and students are ready to solve. Bars are retained in place by the grooves and bumpers at the ends of the grooves, so pieces are not scattered. This may allow better classroom control, as there is a well-defined place for the pieces. The bars are physically segmented and clearly marked so students can easily perceive the relationship between the counter and its length.

The numberline is ever-present, becoming a significant natural backdrop for activities. Working "within" the numberline makes more sense and allows ideas to be seen more quickly and intuitively. Children can quickly move to predicting and confirming solutions, then on to abstraction. With the multi-track solving environment where the number line is ever-present, students have the opportunity to quickly and intuitively see relationships between different numeric ideas and concepts, because related solutions and strategies can be simultaneously displayed on the same numberline. This is ideal for overall class instruction of small student groups taking turns.

As mentioned above, bars are physically segmented in various embodiments, making the counter element very clear. Students can easily perceive the relationship between the counters and the length. Bars are labeled with numbers so they can be easily found and identified.

With reference now to FIGS. 17-23, an alternative embodiment of the system for teaching math is shown where a software tool is used to display a virtual manipulative on a computer screen that is based on the physical manipulative embodiments described above. In at least one embodiment, the computer program is configured to provide the user/student with mathematics problems and, in association with each problem, a virtual manipulative may be used by the student to solve the problems. For example, in one embodiment, the user is shown a math fact and if the answer to the math fact is not immediately forthcoming (suggesting that the student is encountering difficulty) the user is shown visual impressions of the manipulative. For continuity, the image is of the physical manipulative, and can be adapted to incorporate the fact strategies discovered and adopted on the physical manipulative. The program includes various modes where the virtual manipulative can be used in various ways depending on the skill level of the student and the discretion of the educator. Exemplary modes include the following:

Help level one: The manipulative is available immediately upon presentation of the problem.

Help level two: The manipulative is available after a certain amount of time passes with no answer.

Help level three: The manipulative is available after time expires or the problem is missed.

Help level four: The manipulative is not available.

Additionally, the educator may set the manipulative to automatically demonstrate the solution, or be manually placed by the student. The manual placement may be required for the program to move ahead, forcing the student to use strategies instead of finger counting. The program can also allow students to construct their own math strategies, see suggested strategies, and may allow saving their preferred strategies for use in the above reminder system.

Figure 17:
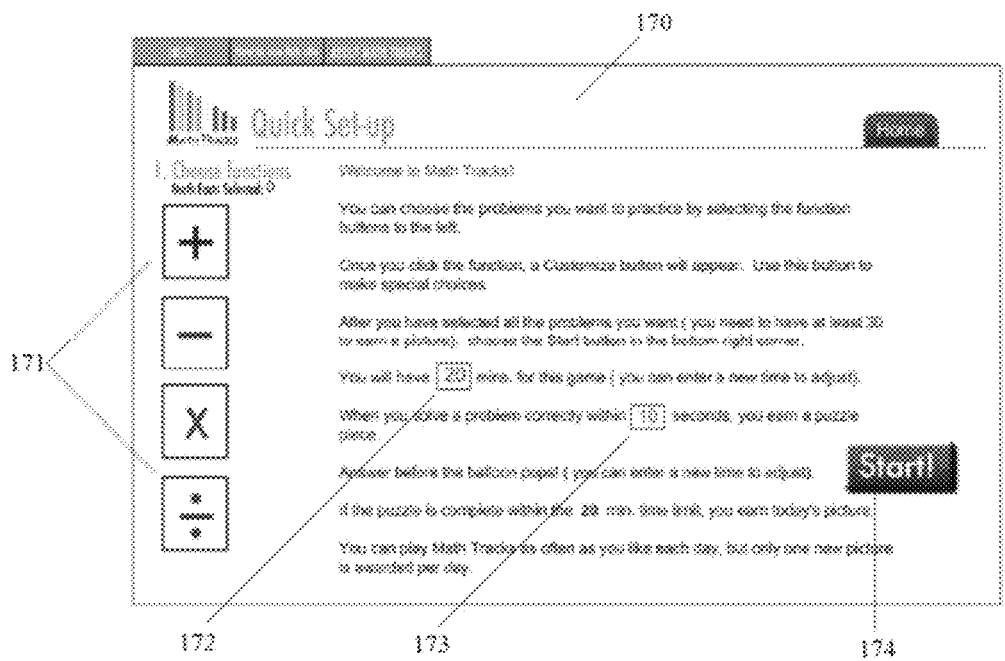
FIG. 17 shows a set-up screen of a computer program used to teach math in association with the device of FIGS. 1-16.

FIG. 17 exemplifies a screen shot from a set-up page 170 of one embodiment of the computer program used to teach mathematics concepts and practice math facts. At the set up page 170, the user may select or input values for the time for the overall game/session in a time box 172. A default setting for the time of the session may be 20 minutes, for example, which can be changed by the user by changing the default setting in box 172. Furthermore, the time per math fact attempted may be input into box 173, which may have a default setting of 10 seconds.

Figure 18:
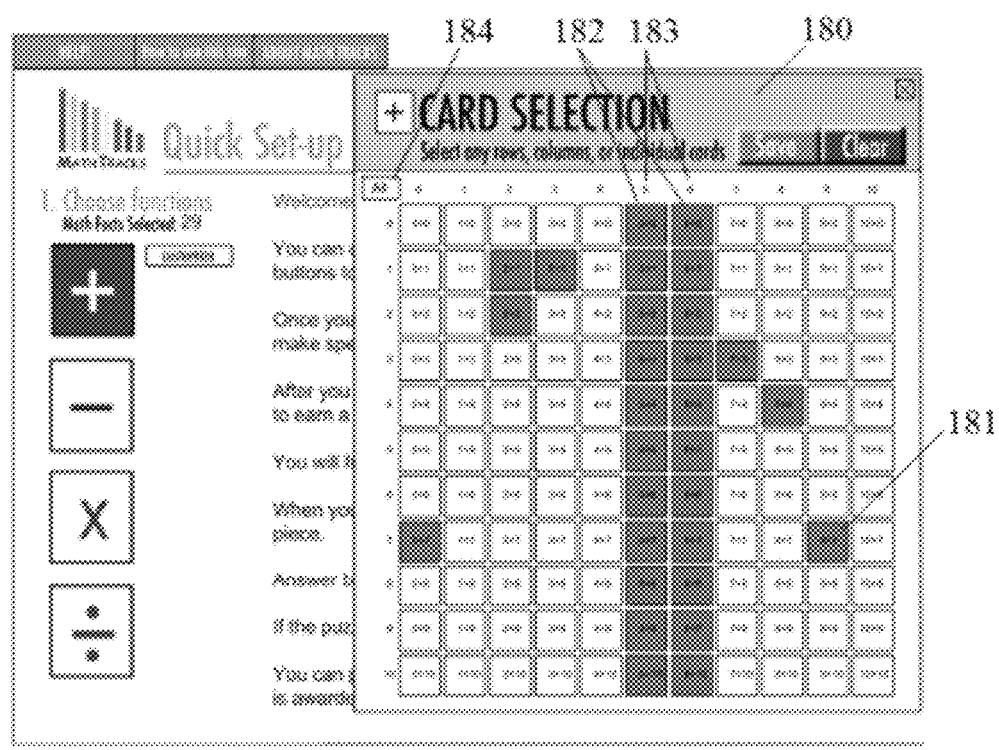
FIG. 18 shows a math fact selection grid provided when a user selects an operand from the set-up screen of FIG. 17.

In addition to the above, the set-up page 170 of FIG. 17 also gives the user (e.g., the educator) the ability to customize a practice session by choosing certain math facts to be presented during the session. To this end, the user selects one or more operands from the column of buttons 171 along the left side of the screen. Upon selection of each operand 171, a selection grid 180 is displayed, as illustrated in FIG. 18. Individual math facts 181 may be selected by clicking on the grid, or a row or column 182 may be selected by clicking on the row or column heading 183, or all facts in the grid may be selected by clicking All 184. Any combination of the four operands 171 of FIG. 17 may be selected.

Figure 19A:
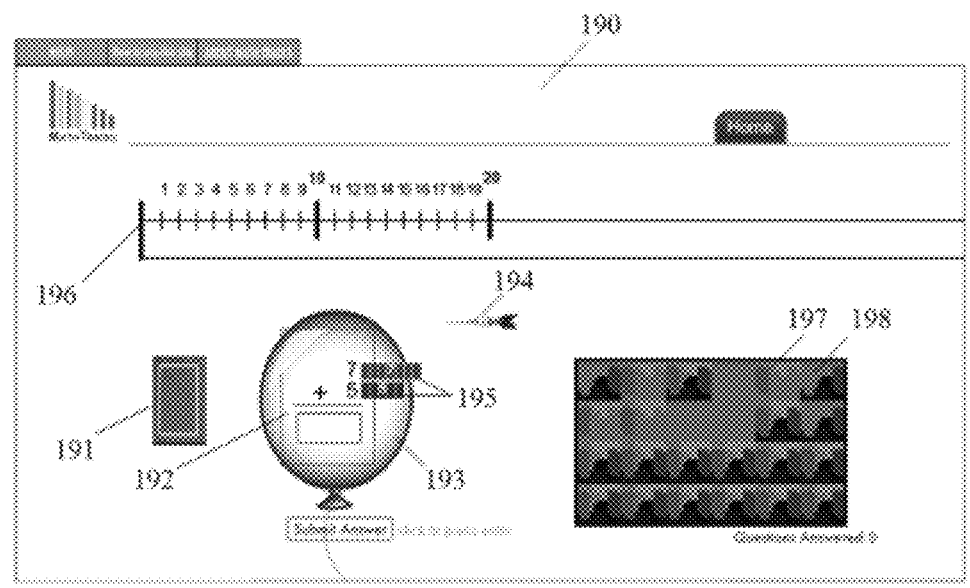
FIG. 19A shows a math testing session page provided after the set-up screen of FIG. 17.

Once final selections are made for the session, and the start button 174 is clicked and the session starts, as illustrated in session page 190 shown in FIG. 19A. The math facts selected are represented on cards in a virtual deck 191 which are successively revealed 192 to the student. The student must provide an answer to each fact before the balloon 193 is popped by the dart 194. The dart 194 travels toward the balloon at a speed based on the time per card 173 chosen on the set-up page 170 of FIG. 17. If the correct answer is not entered in time, the illustrative bars 195 are moved onto the numberline 196 to aid the student in answering correctly. As described previously, the bars may be moved manually by the student, or the program may be set to move them automatically at the proper time based on the help level desired.

With the visual aid present, the student must correct the answer for the particular math fact to proceed to the next math fact. Upon entering the correct answer, the card will be returned to the deck 191 in three strategic locations for additional practice, and will occur again at increasing intervals to aid in moving this fact into long-term memory.

When a currently revealed math fact 192 is answered correctly within the allotted time, it morphs in animation into a puzzle piece 197 in the puzzle 198. Math facts quickly and correctly answered on the initial attempt will not be seen again in that session.

Figure 19B:
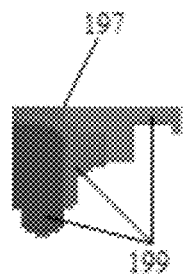
FIG. 19B shows a three part puzzle piece from the math testing session page of FIG. 19A.

Each puzzle piece 197 is divided into thirds 199, as illustrated in FIG. 19B. When a math fact is initially answered incorrectly or too slowly, it is inserted back into the deck three times, and its corresponding puzzle piece is assigned one of these thirds 199 for each of the three reinserted math facts. Thus, the puzzle 198 will always have exactly as many remaining pieces as there are remaining cards in the deck 191. When the session and puzzle 198 are completed, the program provides congratulatory animations and the puzzle reveals a collectible picture of interest for insertion into the student's gallery of completed puzzles.

Figure 20:
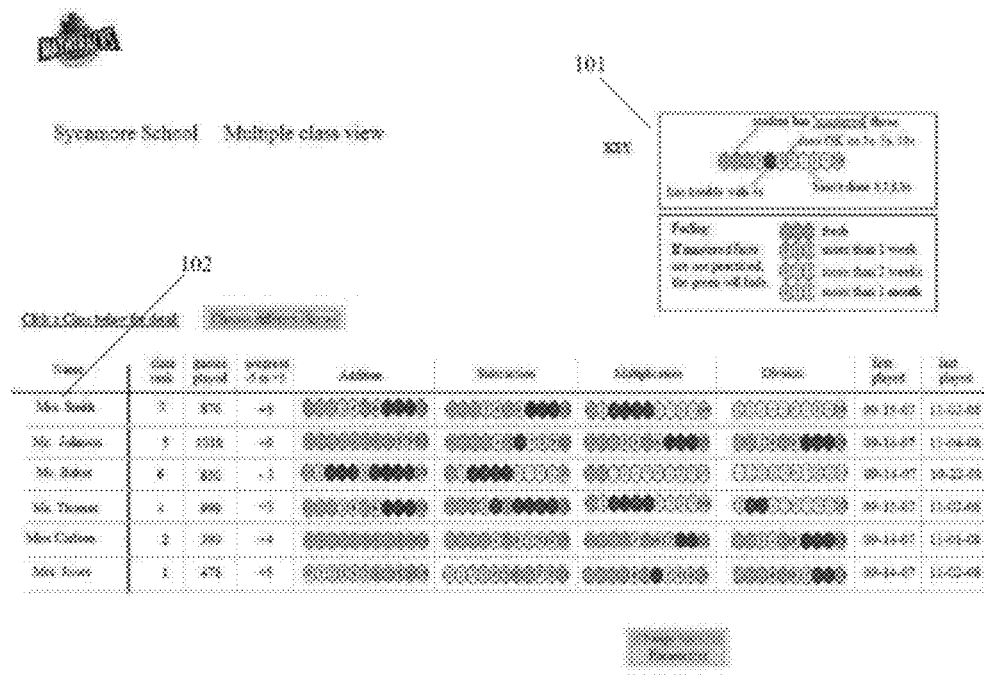
FIGS. 20-21 shows an exemplary reporting page for the computer program used to teach math in association with the device of FIGS. 1-16.
Figure 21:
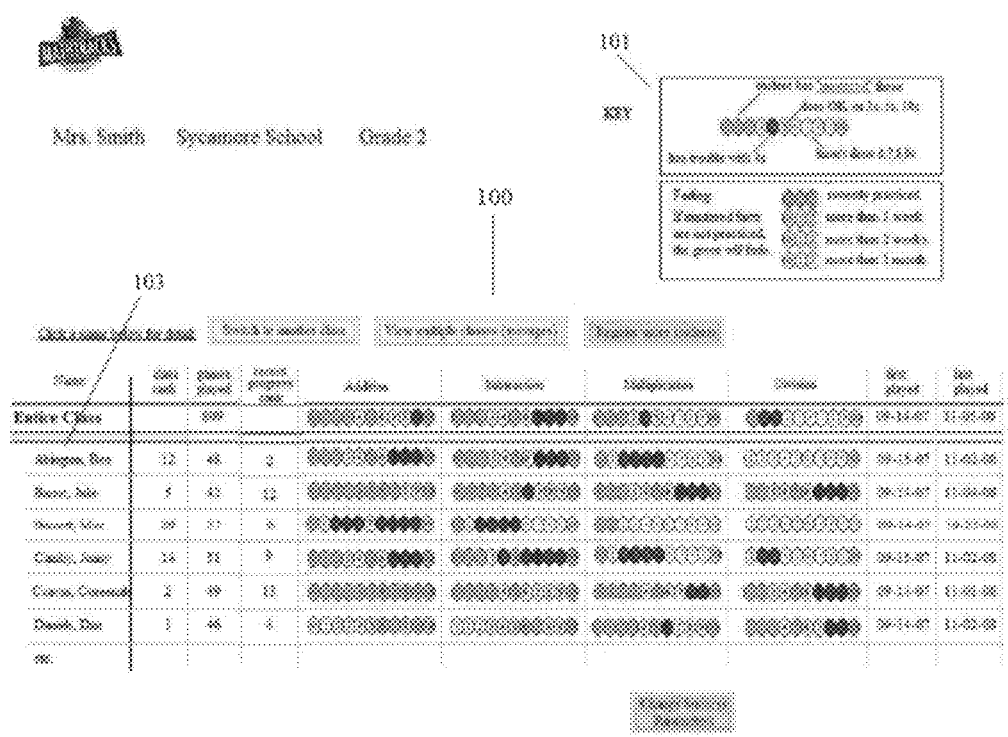
Figure 22:
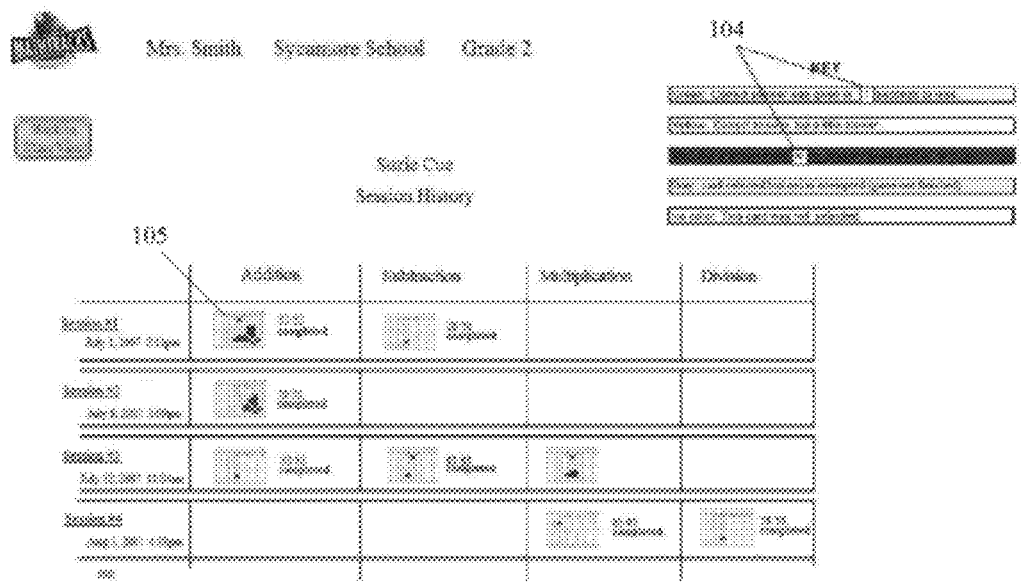
FIGS. 22-23 show individual student reporting pages for the computer program used to teach math in association with the device of FIGS. 1-16.

In at least one embodiment, student performance may be assessed and progress tracked by the computer program through the use of reporting pages. FIG. 21 illustrates an exemplary class-level reporting page 100. At a glance, the green, red and yellow shapes (e.g., circles as shown in FIG. 20) tell the educator how many and which math facts are giving each student difficulty. While viewing this page, the user can change the speed standard, and the colors will change accordingly.

Figure 23:
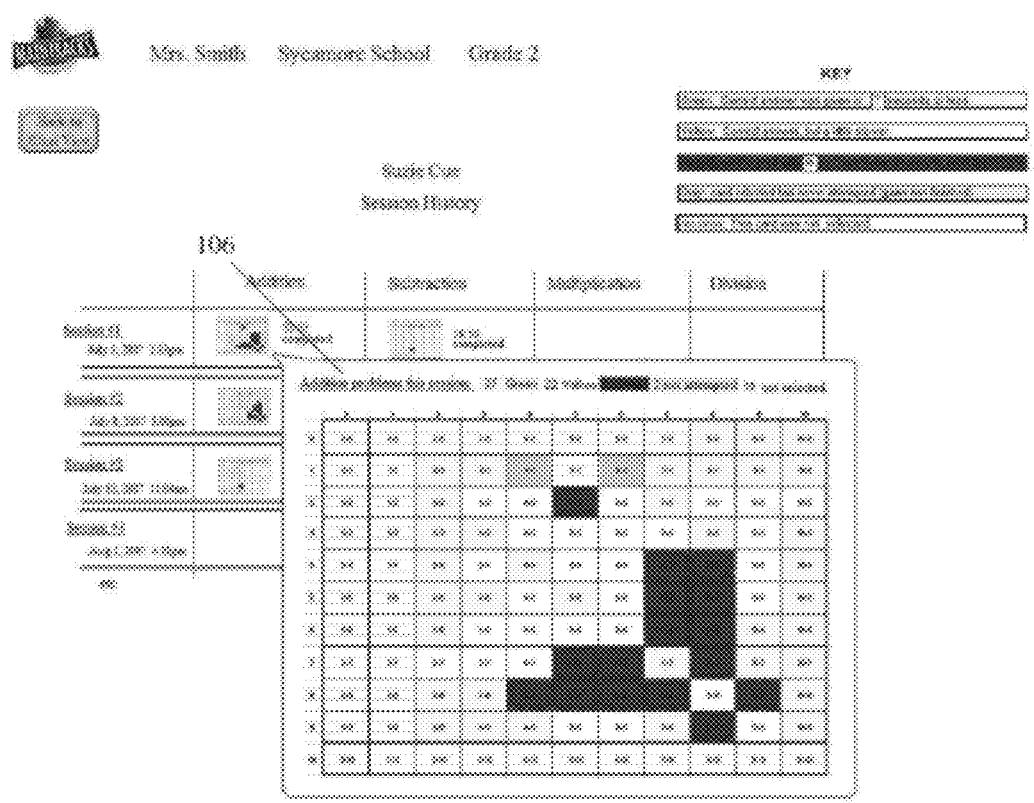

FIG. 20 illustrates an exemplary reporting page at the multiple class level view, where the current average performance level of each class is shown at a glance, based on color coding detailed in the key 101, using the students' performance as measured against standards. Although the color coded performance levels are small to read, the user may magnify any of them with a simple mouse-over. Clicking a teacher name 102 takes the user to the class level view shown in FIG. 21, which shows performance levels for each student within a class, also based on the performance as measured against a standard. In this embodiment, the standard for "mastering" a set of facts is to get greater than 90% of them right over the last 5 times they have worked each fact in the set (with the most recent attempt counting twice). Additionally they must have at least 4 of those 5 correct for each one. For example, if Susie always gets all the 3s right, except 3×9, which she missed 2 of the last 5 times, then she has not "mastered" the 3s yet. A "miss" means missing on the first appearance during a session, or correctly answering in over 7 seconds. Facts colored yellow are not yet mastered, but at least 80% of the facts have been answered correctly within ten seconds. In this embodiment these default standards may be changed by the educator. Clicking on an individual name 103 takes the user to the individual performance detail shown in FIG. 22. Here the standards of measurement can be changed within the key itself 104, which automatically changes the result display 105 accordingly. More specific information is shown in each box, including time to answer, whether help was needed, and the order of the card in the random deck. A statistical summary is provided on the right. These results may be used to quickly set up a new session that may be more appropriate for the student's skill level, or the progress tracking mechanism can determine the next session automatically. When the user mouses over a display result 105, a detailed view 106 appears as shown in FIG. 23.

In various embodiments, elements of the math program may include the following:

1. A visual impression of the problem is instantly available when help is needed, so students can "see the math" when they need help remembering it.

2. Interaction with the virtual manipulative is required to move on: Strategies, not fingers.

3. Instant reward for each correct answer (puzzle pieces).

4. Overall goal for each session is very tangible and reward is immediate.

5. Rewards are collectible, providing incentive to return for another practice session.

6. Sharp design of reporting makes assessment simpler than other programs.

7. Missed problems are "reinserted in the deck" three times and reappear at increasing intervals to move problem facts into long term memory.

8. Program automatically tracks progress to generate the next session plan.

9. Program is used to manipulate virtual manipulatives identically to and immediately after classroom use of physical manipulatives for discovering new facts and fact relationships.

Although a method and system for teaching math has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A device for teaching mathematics comprising:
   a) a plurality of elongated members, each of the plurality of elongated members representing an associated numerical value, wherein at least some of the plurality of elongated members are of different lengths, wherein the length of each of the plurality of elongated members is proportional to its associated numerical value, and wherein the elongated members include indicia that partition each elongated member into a number of unit length segments, the number of segments on each elongated member being equal to the associated numerical value;
   b) at least one retention member configured to receive at least two of the plurality of elongated members, the at least one retention member provided as part of a container configured to store the elongated members, the at least one retention member including a first retention member provided in a base portion of the container and a second retention member provided in a top portion of the container, wherein the top portion is configured to cover the base portion when the container is closed; and
   c) a numberline associated with the at least one retention member, the numberline including a plurality of numbers and markers, wherein each marker is separated from an adjacent marker by a length substantially equal to the unit length.

2. The device of claim 1 wherein the at least one retention member comprises a plurality of retention members extending substantially parallel to each other.

3. The device of claim 2 wherein the retention members comprise a plurality of elongated grooves.

4. The device of claim 3 wherein the plurality of elongated grooves form at least three horizontal tracks extending parallel to each other, each track spaced apart from any neighboring track such that elongated members may be aligned on neighboring tracks without contacting one another.

5. The device of claim 1 wherein the elongated members are bars.

6. The device of claim 1 wherein the elongated members include anti-roll features.

7. The device of claim 1 wherein the indicia include circumferential grooves provided in the elongated member which visually and tactilely segment each elongated member into a number of unit lengths equal to the associated numerical value.

8. The device of claim 7 wherein each of the plurality of elongated members includes beveled ends and the indicia include the beveled ends.

9. The device of claim 8 wherein the beveled end on each of the plurality of elongated members is differently colored than a central portion of the elongated member adjacent to the beveled end.

10. The device of claim 9 wherein placement of a first elongated member in abutment with a second elongated member within the at least one retention member results in a circumferential groove extending between the first elongated member and the second elongated member that is different in color than the circumferential grooves provided completely within the first elongated member or the second elongated member.

11. The device of claim 1 wherein a number is provided on each of the plurality of elongated members, the number representing the numerical value associated with the elongated member.

12. A method of teaching math, the method comprising the steps of;
   a) posing a math question by displaying a math fact comprising a first number, a second number, and a math function;
   b) waiting a predetermined time to receive a correct answer to the math question;
   c) providing a plurality of elongated manipulatives if the correct answer has not been received within the predetermined time, each of the elongated manipulatives representing an associated numerical value, wherein the length of each of the plurality of elongated members is proportional to its associated numerical value, and wherein the elongated members each include indicia that segment the elongated member into a number of unit lengths that is equal to the associated numerical value; and
   d) placing the plurality of elongated manipulatives in association with a numberline in order to visually represent the answer to the math question.

13. The method of claim 12 wherein the plurality of elongated manipulatives are physical manipulatives and wherein the plurality of elongated manipulatives are placed in physical association with the numberline.

14. The method of claim 12 wherein the plurality of elongated manipulatives are virtual manipulatives provided on a computer screen and wherein the plurality of manipulatives are placed in virtual association with the numberline on the computer screen.

15. The method of claim 12 wherein placing the plurality of elongated manipulatives in association with a numberline includes placing ends of the plurality of elongated manipulatives in abutment, the ends being differently colored such that a different color is displayed between any adjacent two of the plurality of elongated manipulatives placed in association with the numberline.

16. The method of claim 15 wherein the ends of the plurality of elongated manipulatives are beveled ends.

17. A system for teaching math comprising:
   a plurality of elongated manipulatives, each of the plurality of elongated manipulatives representative of a numerical value, each of the plurality of elongated manipulatives including indicia representative of a single unit of value on the elongated manipulative, the indicia including at least one beveled end on the elongated manipulative of a contrasting color than a central portion of the elongated manipulative;

a numberline and at least one track associated with the numberline, the at least one track configured to receive at least two of the elongated manipulatives positioned end-to-end on the track, wherein the beveled end of contrasting color highlight a beginning or end of each of the two elongated manipulatives positioned on the track.

18. The system of claim 17 wherein the at least one track comprises a plurality of parallel tracks, each of the plurality of parallel tracks configured to receive a plurality of the elongated manipulatives, and wherein each of the plurality of elongated manipulatives is substantially colored with a color that is associated with the numerical value represented by the elongated manipulative, wherein the at least one track includes a first track and a second track, the first track formed within a base portion of a container, the second track formed within a top portion of the container, and wherein the container is configured to retain the plurality of elongated manipulatives when the base top portion is secured to the base portion.

* * * * *